(12) United States Patent
Taylor et al.

(10) Patent No.: US 7,002,951 B2
(45) Date of Patent: Feb. 21, 2006

(54) AUTOMATIC VOICEMAIL ANNOUNCEMENTS WITH MULTIMEDIA ATTACHMENTS

(75) Inventors: Karen J. Taylor, Danvers, MA (US); Kalpesh Savla, Woburn, MA (US)

(73) Assignee: 3COM Corporation, Marlborough, MA (US)

( * ) Notice: Subject to any disclaimer, the term of this patent is extended or adjusted under 35 U.S.C. 154(b) by 852 days.

(21) Appl. No.: 09/783,740

(22) Filed: Feb. 14, 2001

(65) Prior Publication Data

US 2002/0110114 A1   Aug. 15, 2002

(51) Int. Cl.
  *H04L 12/66* (2006.01)
(52) U.S. Cl. .................................. 370/352; 370/401
(58) Field of Classification Search .................. 379/84, 379/88.17, 112.1, 190; 370/352–356, 401
  See application file for complete search history.

(56) References Cited

U.S. PATENT DOCUMENTS

| | | | | |
|---|---|---|---|---|
| 5,682,383 | A * | 10/1997 | Dahod et al. ................ | 370/364 |
| 5,802,146 | A * | 9/1998 | Dulman .................... | 379/32.03 |
| 5,940,479 | A * | 8/1999 | Guy et al. ............... | 379/93.01 |
| 6,236,653 | B1 * | 5/2001 | Dalton et al. ............. | 370/352 |
| 6,339,591 | B1 * | 1/2002 | Migimatsu ................ | 370/352 |
| 6,680,935 | B1 * | 1/2004 | Kung et al. ............... | 370/352 |
| 6,724,750 | B1 * | 4/2004 | Sun ......................... | 370/352 |

* cited by examiner

*Primary Examiner*—Ricky Ngo
*Assistant Examiner*—Christine Ng
(74) *Attorney, Agent, or Firm*—McGlew & Tuttle, P.C.

(57) ABSTRACT

A network system and method use a distributed network and a network processor connected to the network. System data storage is provided connected to the processor. Administrator data packets including contact telephone data and voice packets are sent by the processor when the network processor receives alert data including one or more of status data, fault data and error data. The administrator data packets include voice data sent as voice packets. The system is advantageously used with a telephone line network interface connected to a public telephone line and connected to the network. The voice packets may be converted to analogue voice signals at the telephone line network interface for the call or the data may be sent to a remote device and converted to analogue at the remote device (or a device connected to the remote device). The system may also be used with network telephones. Each network telephone is connected to the network and sends packets to and receives packets from the network. The network processor sends packets to the network including address data, as the contact telephone data, for one or more of the network telephones for initiating a call based on the address data and for converting the voice packets to analogue voice signals at the one or more of the network telephones for the call.

26 Claims, 5 Drawing Sheets

AUTOMATIC VOICEMAIL ANNOUNCEMENTS WITH MULTIMEDIA ATTACHMENTS

FIELD OF THE INVENTION

The invention relates generally to telephone systems and more particularly to private branch exchange (PBX) systems and distributed telephone network systems such as networks with a component connected to the public telephone system and network connections to user network telephone units.

BACKGROUND OF THE INVENTION

Telephone systems are known which provide a common interface between a plurality of users and a public telephone network. These systems have been referred to as PBX systems. A typical PBX system includes a central box with line cards providing connections to assigned lines of a public telephone network. The central box is connected by wires such as twisted pair wires to individual telephone units. The connection from the central box to the telephone units may be by way of analogue or digital signals. More recently, digital signals are sent by the central unit to the phone units. The digital signals include voice data as well as control and messaging data. The units typically include a simple handset as well as a speaker for paging, intercom type communications and speaker phone applications. Typically the base unit also includes a microphone. The handset is a typical handset providing a speaker and a microphone.

Telephone systems using distributed networks, such as local area networks (LANs) are also generally known. With these systems, a distributed network is provided, such as CSMACD (IEEE 802.3) generally known as Ethernet. A telephone network system is provided with a central box having line cards connected to the distributed network. Network devices are also connected to the Ethernet network. The network devices include network telephones with, for example, a base unit with a speaker and a microphone and a handset (with a speaker and a microphone). Data packets are sent over the network between network devices. A network control processor or the network call processor (NCP) may be used to monitor and control the access to the public telephone network. Features specific to the user may be established with the NCP.

Computer network systems typically include a control feature. This allows an administrator to monitor the network system. The control feature normally allows for basic network functions to be monitored, the status of components to be monitored, the connectivity status of connected devices to be monitored, as well monitoring system resources. The interface between the administrator at the system can be by a graphical user interface or other similar software interface convenience. It is also known to send e-mail messages to a connected network device to alert the administrator of some situation. The e-mail alerting feature is useful but is constrained by physical limitations of the network as well as the physical position of the administrator or administrators.

SUMMARY AND OBJECTS OF THE INVENTION

It is an object of the invention to provide a network system with a processor connected to the network for monitoring system functions of the network and for sending voice packets based on voice data and based on contact telephone data saved on data storage which is accessed by the processor.

According to the invention, a network system is provided comprising a distributed network and a network processor connected to the network. System data storage is provided connected to the processor. Administrator data packets including contact telephone data and voice packets are sent by the processor when the network processor receives alert data including one or more of status data, fault data and error data. The administrator data packets include voice data sent as voice packets.

The system is advantageously used with a telephone line network interface connected to a public telephone line and connected to said network, the network processor sending packets to the telephone line network interface for initiating a call based on the contact telephone data. The voice packets may be converted to analogue voice signals at the telephone line network interface for the call or the data may be sent to a remote device and converted to analogue at the remote device (or a device connected to the remote device).

The system may also be used with network telephones. Each network telephone is connected to the network and sends packets to and receives packets from the network, including control packets from the network processor and telephone voice packets. The network processor monitors a network telephone system including the network, and the network telephones. The network processor sends packets to the network including address data, as the contact telephone data, for one or more of the network telephones for initiating a call based on the address data and for converting the voice packets to analogue voice signals at the one or more of the network telephones for the call. A remote network telephone may also be connected to the network via an Internet gateway or through other wide area networks. The network processor sends packets to the network including address data, as the contact telephone data. The voice packets may be converted to analogue voice signals at the one or more of the network telephones for the call.

The administrator alert voice data may alternatively be sent to a network device connected to the network. The network device sends packets to and receives packets from the network. The network processor sends packets to the network device including address data, as the contact telephone data, for the network device for initiating a voice message based on the address data and for converting the voice packets to analogue voice signals at the network device. The voice data may be in the form of a WAV file. The network device may also be operatively connected to a paging system for initiating a page.

A software interface may provide a display of data in the data storage. The data may include settings data and preferences, for changing at least the contact telephone data and for associating voice messages comprised of the voice data with one or more of potential status data, fault data, error data or types of status data, fault data or error data and established criteria. The software interface may be a graphical user interface for establishing settings and preferences including defined criteria for sending administrator data packets. The voice data includes a plurality of message prompts whereby the software interface allows selection of one or more of the prompts for sending upon defined criteria being reached by the network system. The defined criteria includes one or more of disk space status, memory status, error messages and connection status.

Preferably at least one of the network telephones provides a display of at least some data in the data storage. This data may include settings data and preferences, for changing at least the contact telephone data, and for associating voice messages comprised of the voice packets with potential status data, fault data or error data or types of status data, fault data or error data.

The line card connected to a public telephone line may be connected to the network via a chassis backplane. The network processor sends packets to the telephone line card for initiating a call or connection based on the contact telephone data via an Ethernet path having a collision domain established with the backplane. The network telephones may then be connected another Ethernet path having a collision domain providing a connection to the other collision domain.

A network server with data storage may be connected to the network. The network call processor may be connected to the server. The server may provide the primary or backup data storage.

According to another aspect of the invention, a network process is provided including providing the network system including, the network processor, and the system data storage and devices connected to the network. The process includes monitoring at least the status of the network system with the network processor and issuing an alert voice message including sending voice packets with voice data saved in system data storage based on contact telephone data saved in the system data storage.

The software interface at a network device may advantageously be a web browser. Web pages may be provided accessible from the data storage based on an address associated with the network.

The voice data may advantageously include a plurality of message prompts whereby the software interface allows selection of one or more of prompts for sending to one or more network audio playing device, based on said contact telephone data, upon defined criteria being reached by said network system. At least some of said message prompts may be prerecorded and precorrelated with defined criteria for sending administrator data packets.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
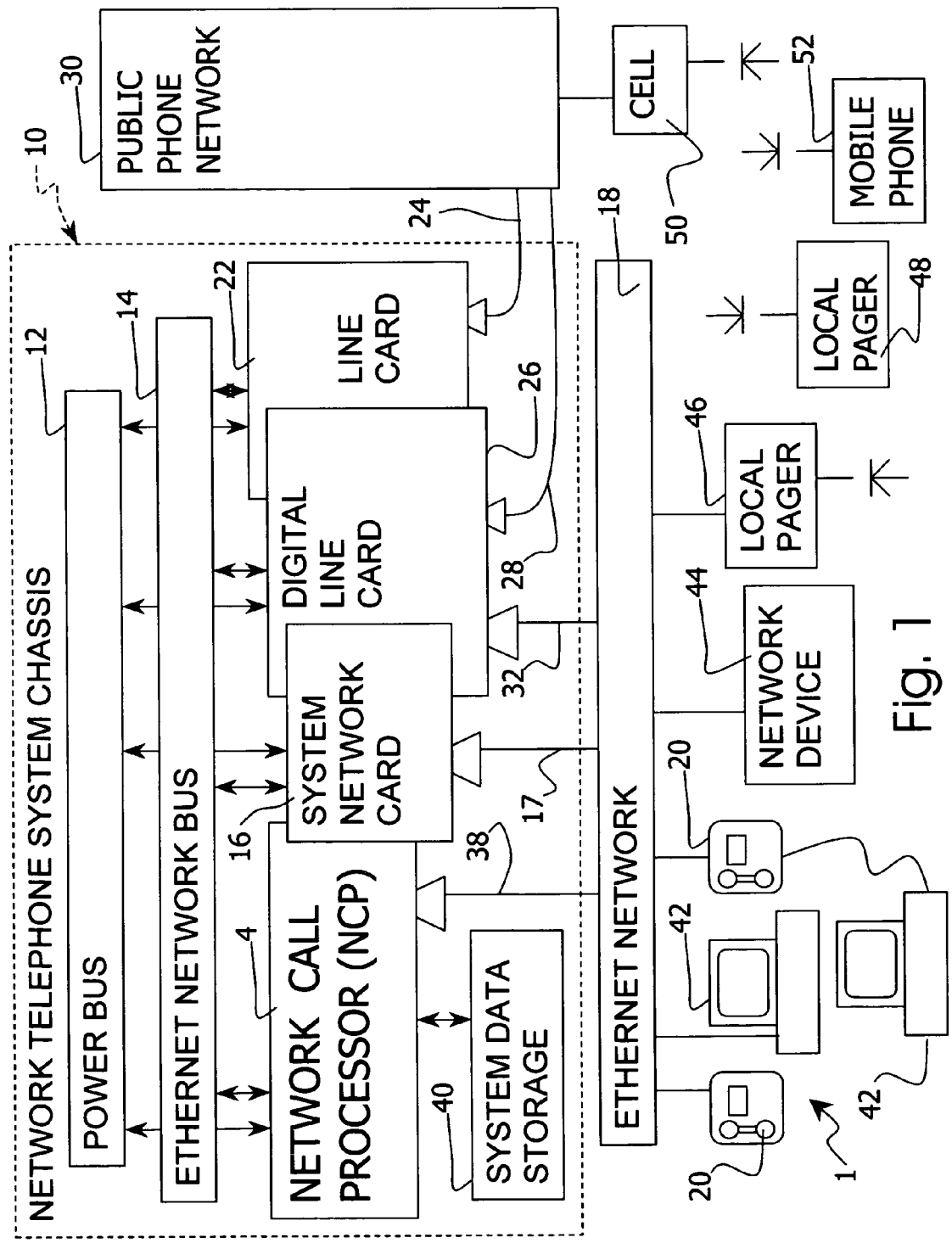
FIG. 1 is a system diagram showing system features according to the invention.

Referring to the drawings in particular, the invention comprises a network system generally designated 1. The system includes a network call processor (NCP) 4. The NCP is a network control processor that monitors the network system 1.

A preferred embodiment of the invention provides a network telephone system with network telephone devices 20. In the embodiment shown the NCP 4 is provided in a network telephone system chassis 10 that provides power through power bus 12 and provides a network connection through the Ethernet network bus 14. The NCP 4 is connected to the Ethernet network bus 14 and the power bus 12. The system network card 16 provides a connection 17 from the NCP 4 to an Ethernet network 18. The network telephones 20 are connected to the Ethernet network 18 as network devices. A line card 22 is also connected to the power bus 12 and Ethernet bus 14. The line card 22 is connected to a public phone network (or other data network) 30 as shown at 24. Other line cards such as a digital line card 26 may also be provided (e.g., a T1 line). The digital line card 26 is also connected to the public phone network or other data network 30 as shown at 28. The digital line card 26 is connected to bus 14 and may also be directly connected to the Ethernet network 18 as shown at 32. The NCP 4 may also be connected directly to the Ethernet network 18 as shown at 38. The particular arrangement shown is not critical to the system of the invention. Any of the units shown in the network telephone system chassis 10 may be provided separately or in combination with other network devices. This is described later with respect to FIG. 5. In the embodiment shown in FIG. 1 system data storage 40 is provided connected to the NCP 4. The system data storage 40 can also be provided separately or in combination with other network devices. Advantageously, according to a preferred embodiment, the NCP 4 is connected to multiple data storage facilities. At least a backup data storage facility can be provided connected to or associated with a different network device connected to Ethernet network 18.

Various network devices can be connected to the Ethernet network 18. These include the network telephones 20, computers 42 and other network devices designated 44. Network device 44 may be a broadcast speaker paging system for a facility or any other network device capable of playing out an audio signal. A network device in the form of a local pager 46 may be connected to the Ethernet network 18 to send a radio frequency signal to a local pager device 48. The public telephone network 30 is connected to a cellular network 50 which communicates with mobile phones such as mobile phone 52. Although specific examples are given, various connections may be made to local area networks and to wide area networks.

The NCP 4 includes a processor 56 which is connected to system data storage 40. The processor 56 monitors telephone network traffic and other network features. The processor cooperates to establish conference calls and establishes system user data. The processor 55 may also monitor other network functions or may receive packets from other network control devices relating to network functions such as status, errors, faults etc. Upon an event occurring which is monitored, or upon receiving packets from another network control device which have network information which must be conveyed to the administrator, based on established criteria; the processor 56 accesses data from data storage 40 for sending out a voice alert message to the administrator of the system 1. The data in data storage 40 preferably includes contact telephone data and digital voice data. The processor 56 sends packets including data from data storage 40.

Figure 2:
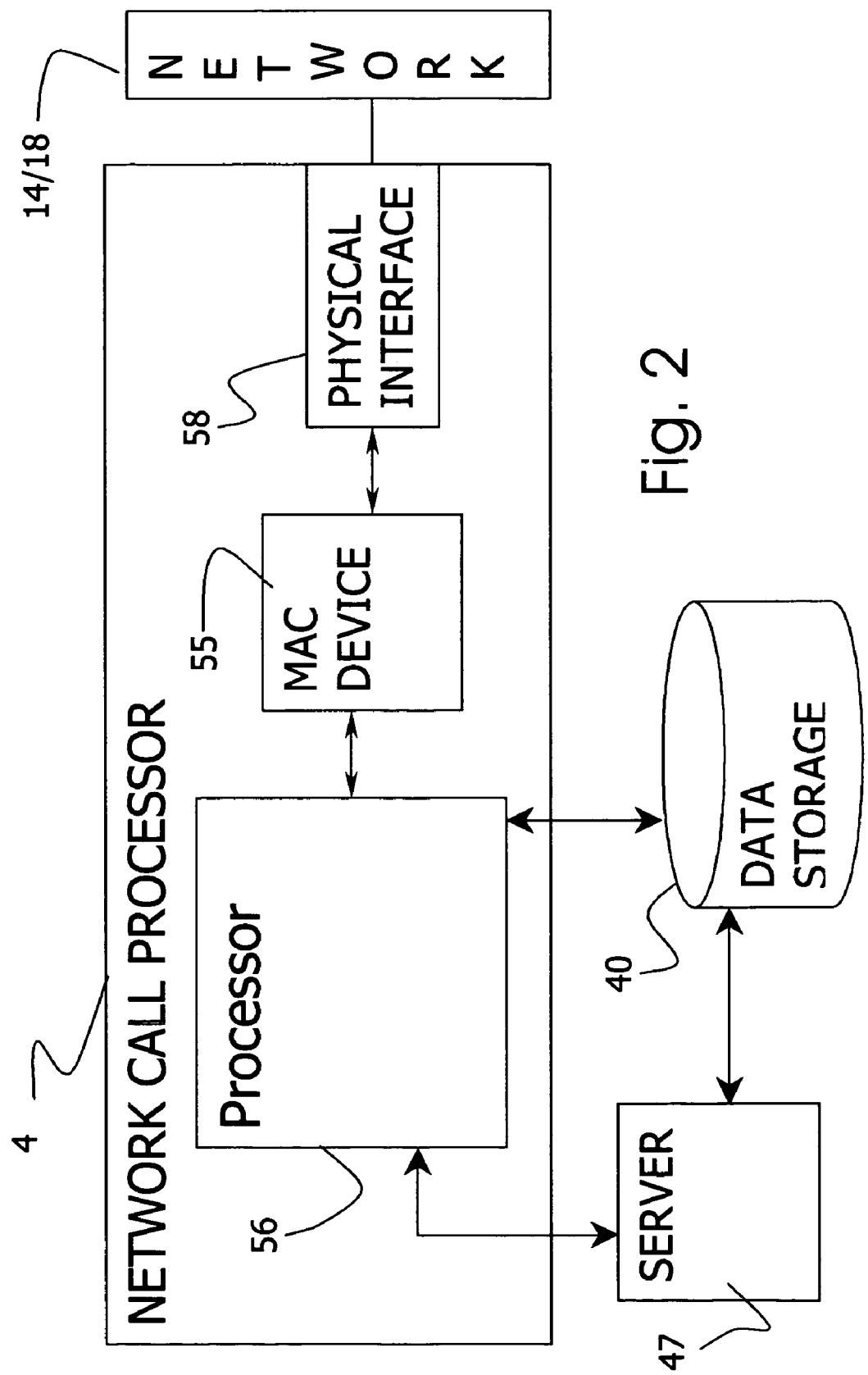
FIG. 2 is a diagram showing features of the network processor, particularly a telephone network processor.

The NCP 4 may have a direct connection 38 to the Ethernet network 18 via MAC device 56 and physical interface 58, as shown in FIG. 2. As an alternative to the embodiment shown in FIG. 1, the NCP 4 may be directly connected to a server 47 which itself is connected to the Ethernet network 18. The data storage 40 may be connected to the server.

Figure 3:
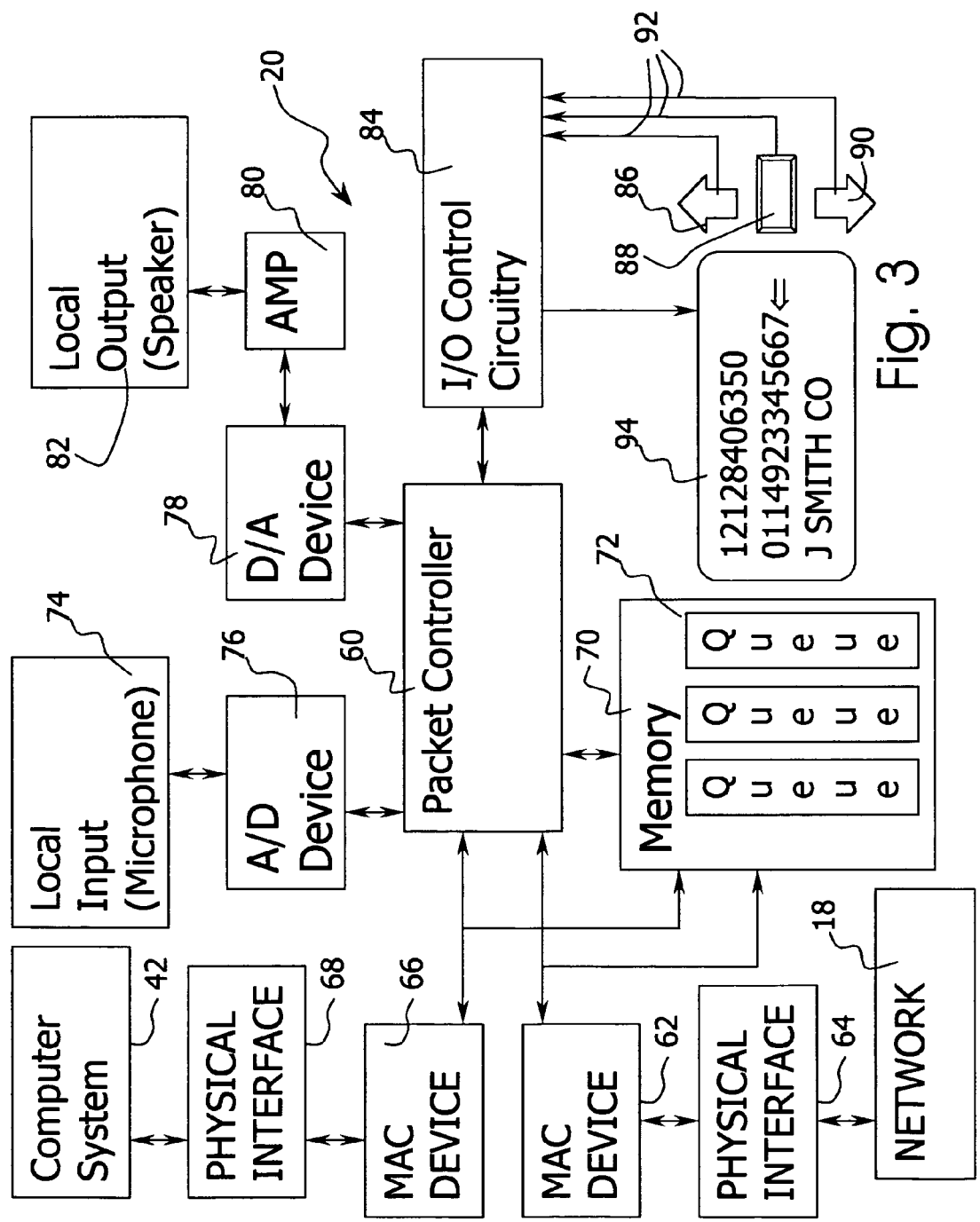
FIG. 3 is a diagram showing features of a network telephone device according to the invention.

The system of the invention's provides a device which is connected to the network which can convert digital voice data to analog voice data for playing out at a speaker. The connection to the network may be through a public or private network and may be via a wireless or wired connection. According to the preferred embodiment, the network system includes a network telephone system with a network telephone unit 20 as shown in FIG. 3. The device 20 includes a packet controller 60 for receiving packets, sending packets and forwarding packets received from the network 1 to an associated network device 42, when the packet is addressed to the associated device 42. The device 20 may be used such that two different collision domains (using CSMA/CD) are established, one at the side of the computer system 42 and one at the network 1 (this is explained in applications Ser. Nos. 09/204,102; 09//203,542; and 09/204,107, which are hereby incorporated by reference). The network telephones may be provided as described in U.S. application Ser. No. 09/204,102; and/or U.S. application Ser. No. 09//203,542; and/or U.S. application Ser. No. 09/204,107.

According to a preferred embodiment of the invention, the network telephones 20 each include a base unit with handset. Basic function keys (numbers etc.) may be provided. The network telephone 20 has a connection to the Ethernet type network 18 discussed above. Each unit 20 has at least a MAC device 62 connecting the unit via a physical interface 64 to the network 42. Preferably another MAC device 66 is provided connecting the unit via physical interface 68 to an associated network device 42, such as a network interface card of a computer system. Packets are sent and received over the network 18 and packets are sent and forwarded to the computer system 42 via the packet controller 60 from the network 18 or packets are forwarded from the computer system 42 via the packet controller 60 to the network 18. A memory 70 is provided whereby packets can be queued as shown at 72 for play out, for mixing or some other memory functions can be provided. A local input 74 in the form of a microphone is provided in the handset with an analog to digital converter device 76 providing the local input to the packet controller 60. At the output side a digital to analog converter device 78 converts packets to audio signals which are amplified at amplifier 80 and produced at local output (speaker) 82. The network telephone 20 includes input/output control circuitry 84 for controlling a display 38 as well as for receiving input signals from keys such as keys 86, 88 and 90 via connection circuitry 92. A display 94 is preferably a liquid crystal display (LCD). The packet controller 60 may include a timer, a digital signal processor (DSP), a processor (e.g., an ARM processor), a direct memory access (DMA) controller, control circuitry, an address table, and a memory controller coupled to each other by a signal bus. The DSP is in electrical communication with the A/D device 78 via a signal path and in electrical communication with D/A device 78 via a signal path. The memory controller is in electrical communication with the memory 70 by signal lines. The DMA controller is in electrical communication with the MAC devices 62, 66 by signal lines. The address table stores addresses that are of importance to the network telephone 20. Examples of such addresses include the address of the other network telephones 20, an identifier for a conference call, and a general broadcast address.

Figure 4:
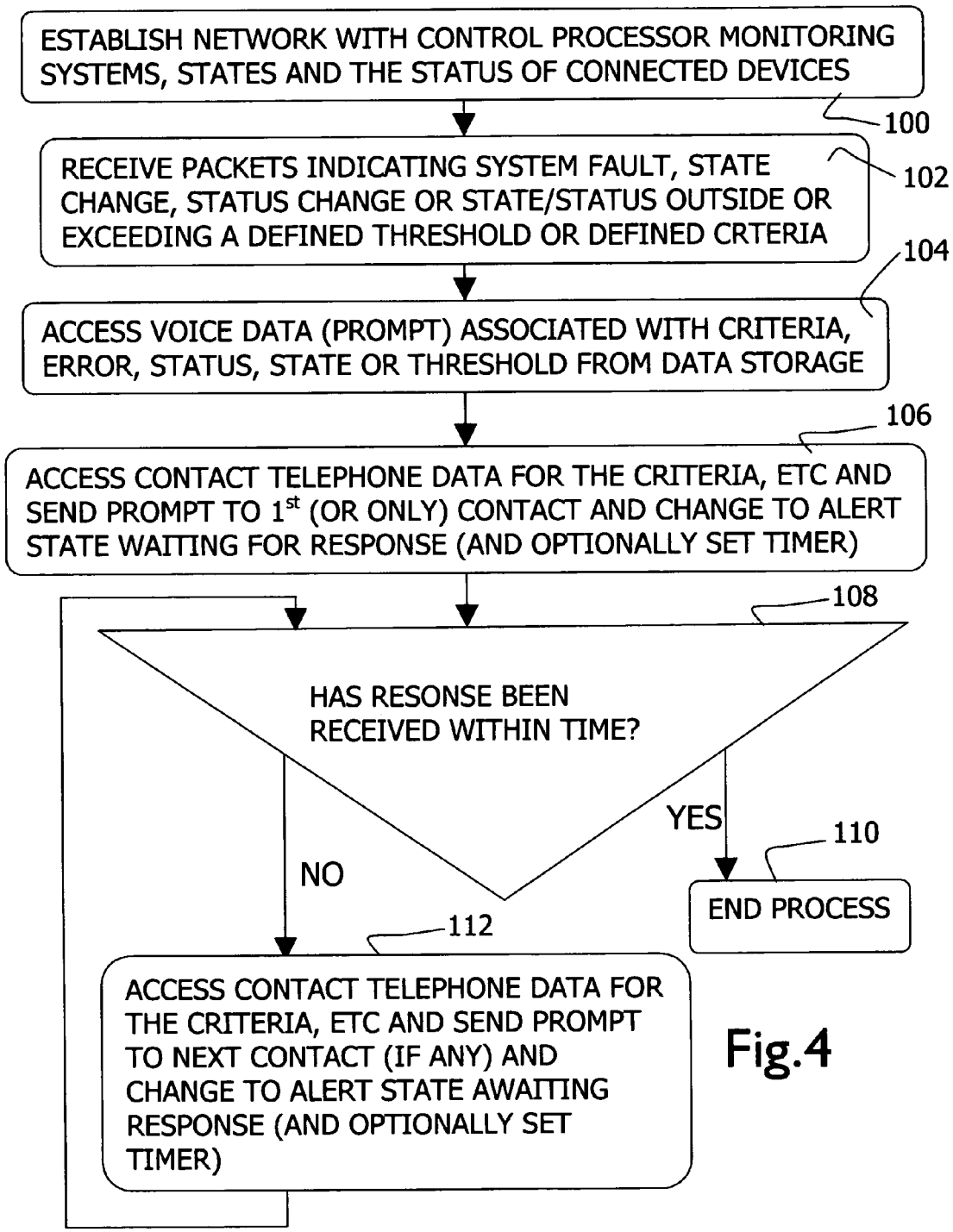
FIG. 4 is a flow diagram describing features according to the process of the invention.

In operation, a network is established with a processor 4 monitoring some network system attributes or receiving signals from other network devices such as network control devices as indicated at 100 in FIG. 4. The NCP 4 receives indication from system components or receives packets which indicate a system fault, a state change, a status change or some other signal which must be brought to the attention of the administrator. The types of signals or criteria which are of interest include status data relating to the network telephone system. The NCP detects a situation which requires an administrator alert as indicated at 102 in FIG. 4. The process allows for an alternate system data facility to be used, such as another hard disc drive associated with server 47 to be used as the source of the administrator alert data if a problem is detected with the primary data storage 40. If there is a problem with data storage 40 the alternate data storage device is used. Normally, the data storage 40 is used.

When the NCP receives an indication of the system or component being outside defined criteria, or other situations which require an administrator alert, the NCP accesses the voice data (e.g., a prompt) from the data storage, as indicated at 104 in FIG. 4. The NCP 4 may follow guidelines established by the administrator using the software interface for sending a particular prompt based on a particular situation. According to a preferred embodiment of the invention, the prompts are prerecorded. Further it is advantageous to correlate predefined, prerecorded prompts with particular situations where devices or systems are outside a particular criteria or threshold. Of course the system also lends itself to making custom prompts, such as using a network telephone 20 to add promts or replace prerecorded prompts. After accessing the prompt, or simultaneously, the NCP accesses the contact telephone data for the particular criteria as shown at 106. The contact data may be a single telephone number or extension. Further, voice data can be sent to multiple numbers simultaneously or in succession. As shown in FIG. 4, the process can access the first contact and change to an alert state waiting for a response. A timer can be set such that if no responses is received within a preset time, a second contact may be sent the voice message. This can be continued until a response is received and the NCP may cycle through the list of contacts indefinitely. Different alternatives are possible including combinations of e-mail, paging, etc., with the sending of voice data files.

The contact telephone data and voice data is used by the NCP 4 as described above. The NCP 4 packetizes the data addressed to either a network device connected to Ethernet network 18 or to a device connected to Ethernet network bus 14, depending upon preset selected by the administrator. The data may be sent in various ways to various predetermined audio speakers, voice mail boxes telephones and network devices.

An advantageous use of the system includes providing administrator data packets in particular situations. The data packets include voice data and contact telephone data, such as an address or phone number.

With access via the network line interface, particularly line cards 22 and 26, the network call processor may send packets to initiate a call. The contact telephone data includes a public telephone number and voice packets are converted to analog voice signals at the line card. This allows the administrator to be reached at any phone such as a mobile phone 52. In addition to the voice data, an email message may be sent or a page may be initiated (an audio page at the facility, a page to a pager device, etc.).

The system of FIG. 1 provides a PBX type phone system using an Ethernet platform, the Ethernet network 18. The network system process provides a plurality of telephones 20 connected to the network 18 and sends packets and receives packets from the network 18. The packets may include control packets from the NCP 4 to the device 20 or control packets from the network telephone 20 to the NCP 4. The administrator alert data may be sent to a network telephone 20. The NCP 4 packetizes the voice data addressed to the network telephone 20. The network telephone 20 converts the voice data to analog signals to play at the speaker 82.

The digital line card connection 28 (T1 line/Internet gateway) or some other connection may provide a connection of the network system 1 to the Internet or some other wide area network. The network telephone 20 may also be connected to the internet or the wide area network at a remote location, specifically remote from the Ethernet network 18. The administrator alert data is then sent to the remote network telephone 20 in the same manner as described above but via the Internet gateway. The contact telephone data is the address used for sending packets. The NCP may also address administrator alert data to other network devices. For example, a network device 42 (connected directly to Ethernet network 18 or connected to Ethernet network 18 via network telephone 20) can include a sound card converting the digital signals (e.g. a WAV file) to analog signals for playing over the computer speakers. A device can be connected to the network which provides a connection to a loud speaker. The process may also provide both a sending of voice data to a network device and also a sending of data to a local paging device (sending a radio frequency paging signal or similar) which may be used for a facility to page an individual.

Figure 5:
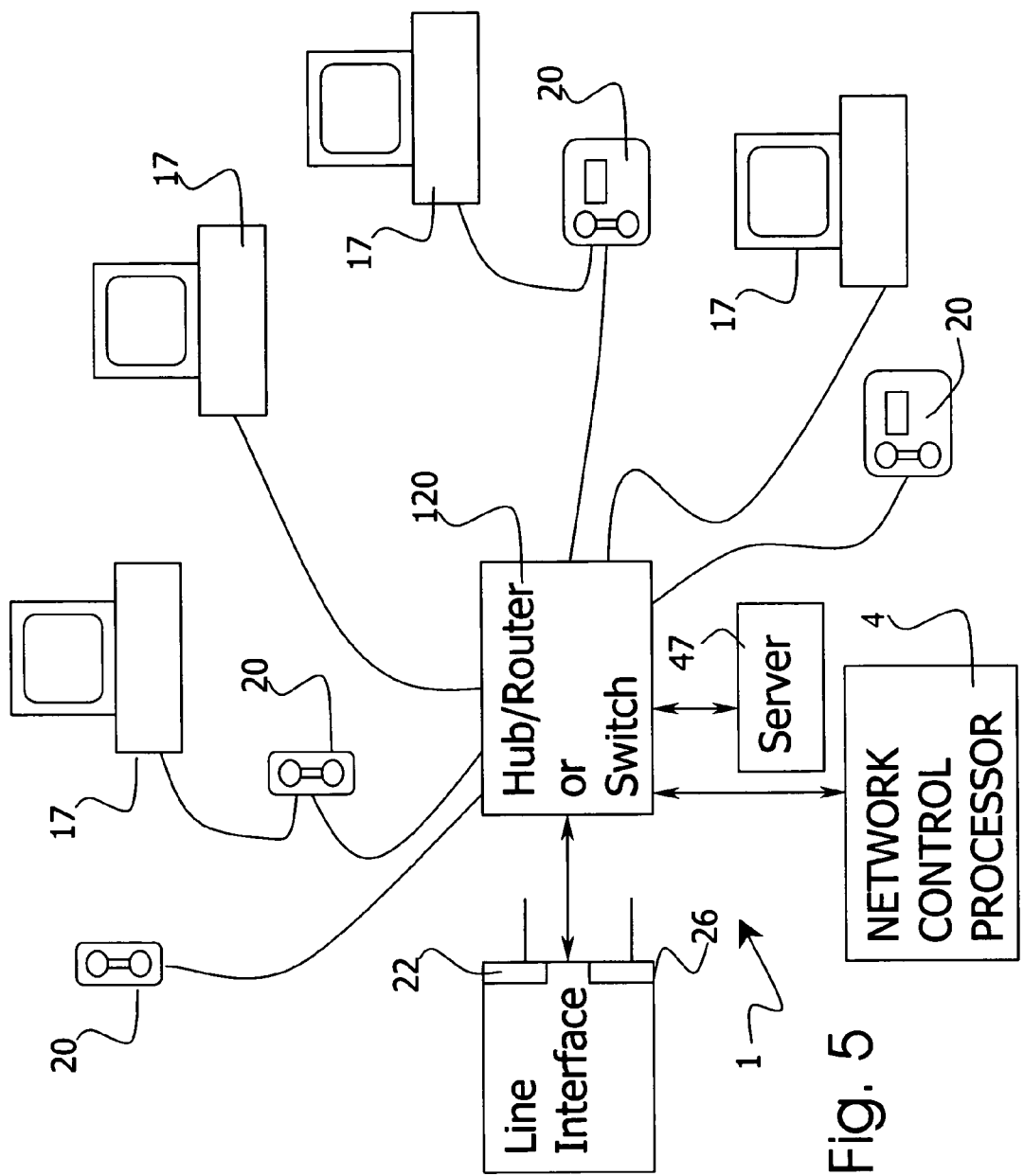
FIG. 5 is a diagram showing network configuration features.

The telephone system 1 may be deployed with the NCP 4 in a server 47, or as a separate unit or in the chassis 10 with the line interface cards 22 and 26, as described above. The typical configuration may employ a hub/router or switch 120 Connecting various network devices. FIG. 5 shows various network telephones 20 and computer or terminal units 42. The computers 42 are either connected directly to hub 120 or are connected through telephone 20.

The invention provides the advantage of using voice data in transmitting an alert message. This allows the administrator to establish convenient ways of being reached, including via mobile phone 52 (which may also have voice mail), via the administrator's network telephone 20 (which also has voice mail) and by various other combinations of telephones or network devices with any combination of other contact mechanisms such as e-mails and paging. The messages may be provided with different priorities or with content which differs based on the situation encountered. Additionally, voice data may be sent to users of the system that are not the administrator. For example, as the NCP 4 monitors tel\ephone call traffic, the NCP 4 may be used to build a user database of calls received and calls placed by a user at a network telephone 20. The user of the network telephone 20 may be alerted by receiving a call to the network telephone 20 (or receiving voice mail) indicating that the data storage amount allocated for the user's telephone numbers is about to be exceeded. The user may then review the telephone numbers and delete unwanted numbers from the database. A similar voice message may be sent to indicate that the voice mail space is about to be exceeded (voice mail box full).

The system provides numerous possibilities including different possibilities for connection, different possibilities for voice data content and different contact telephone data possibilities. This allows the users to customize the system to work best for a given situation.

While specific embodiments of the invention have been shown and described in detail to illustrate the application of the principles of the invention, it will be understood that the invention may be embodied otherwise without departing from such principles.

What is claimed is:

1. A network system, comprising:
    a distributed network system;
    a network processor said processor being connected to a network;
    system data storage, said processor being connected to said system data storage; and
    sets of administrator data packets including contact telephone data of a network administrator and voice packets, said voice packets having human speech message content, said network processor receiving alert data including one or more of status data, fault data and error data, selecting one of said sets of administrator data packets based on a predefined correlation of said sets of administrator data packets to said one or more of status data, fault data and error data and initiating an outgoing telephone call including sending the selected packets in response to said alert data including sending voice packets to a contact telephone of the network administrator based on said contact telephone data with receipt of the voice packets at the contact telephone of the network administrator upon acceptance of the telephone call.

2. A network system according to claim 1, further comprising:
    a telephone line network interface connected to a public telephone line or wide area network and connected to said network, said network processor sending packets to said telephone line network interface for initiating a call based on said contact telephone data.

3. A network system according to claim 2, wherein said voice packets are converted to analogue voice signals at said telephone line network interface for said call.

4. A network system according to claim 1, further comprising:
    a plurality of network telephones, each network telephone being connected to said network and sending packets to and receiving packets from said network, including control packets from the network processor and telephone voice packets, said network processor monitoring a network telephone system including said network, and said network telephones, said network processor sending packets to said network including address data, as said contact telephone data, for one or more of said network telephones for initiating a call based on said address data and for converting said voice packets to analogue voice signals at said one or more of said network telephones for said call.

5. A network system according to claim 1, further comprising:
    a network telephone connected to said network via an Internet gateway, said network telephone sending packets to and receiving packets from said network via said gateway, including control packets from said network processor and telephone voice packets, said network processor sending packets to said network including address data, as said contact telephone data, for said network telephone connected to said network via the Internet gateway for initiating a call based on said address data and for converting said voice packets to analogue voice signals at said one or more of said network telephones for said call.

6. A network system according to claim 1, further comprising:

a network device connected to said network, said network device sending packets to and receiving packets from said network, said network processor sending packets to said network device including address data, as said contact telephone data, for said network device for initiating a voice message based on said address data and for converting said voice packets to analogue voice signals at said network device.

7. A network system according to claim 1, further comprising:
a network device connected to said network, said network device sending packets to and receiving packets from said network, said network device being operatively connected to a paging system, said network processor sending packets to said network device including address data, as said contact telephone data, for said network device for initiating a voice message based on said address data and for converting said voice packets to analogue voice signals at a device and for initiating a page at said paging system.

8. A network system according to claim 1, further comprising:
a network device connected to said network and a software interface providing a display of data in said data storage, said data including settings data and preferences for changing at least said contact telephone data and for associating voice messages comprised of said voice data with one or more of potential status data, fault data, error data or types of status data, fault data or error data and established criteria.

9. A network system according to claim 8, wherein said software interface is a graphical user interface for establishing settings and preferences including defined criteria for sending administrator data packets.

10. A network system according to claim 8, wherein said software interface allows selection of one or more of said different human speech message content for each of said sets of administrator data packets for sending upon defined criteria being reached by said network system.

11. A network system according to claim 8, wherein said established criteria includes one or more of disk space status, memory status, error messages and connection status.

12. A network system according to claim 4, wherein at least one of said network telephones provides a display of at least some data in said data storage, said data including settings data and preferences for changing at least said contact telephone data and for associating voice messages comprised of said voice packets with potential status data, fault data or error data or types of status data, fault data or error data.

13. A network telephone system comprising:
a distributed network;
a network call processor connected to said distributed network, said network call processor having a memory for system settings and administration information;
a telephone line network interface connected to a telephone line and connected to said distributed network for receiving packets in the same collision domain as said distributed network or connected to a network with a different collision domain or a wide area network for receiving packets for said distributed network via said network with a different collision domain or via said wide area network;
a plurality of network telephones, each network telephone being connected to said network and sending packets to and receiving packets from the network, including control packets from the network call processor and telephone voice packets from telephone line signals at said telephone line network interface, said network call processor monitoring said system; and
sets of administrator data packets each of said sets including contact telephone data of a network administrator and voice packets, said contact data of a contact telephone corresponding to a network telephone address, or an address for sending packets to the telephone line network interface and a telephone number of a telephone connected to the public switched telephone network of the telephone line, said voice packets having human speech message content, said network call processor receiving alert data during monitoring including one or more of status data, fault data and error data and selecting one of said sets said administrator data packets based on a predefined correlation of said human speech message content to said one or more of status data, fault data and error data and making a telephone call including initiating the call to the contact telephone by sending the selected packets in response to said alert data including voice packets to the contact telephone based on said contact telephone data with receipt of the voice packets at the contact telephone of the network administrator upon acceptance of the telephone call.

14. A network system according to claim 13, further comprising a network server with data storage, said network call processor being connected to said server.

15. A network telephone system comprising:
a distributed network;
a network call processor connected to said network, said network call processor having a memory for system settings and administration information;
a telephone line network interface connected to a telephone line and connected to said network;
a plurality of network telephones, each network telephone being connected to said network and sending packets to and receiving packets from the network, including control packets from the network call processor and telephone voice packets from telephone line signals at said telephone line network interface, said network call processor monitoring said system and issuing a notification upon the system reaching one or more defined criteria, wherein the notification includes sending one of several prompts from the network call processor to one of the network telephones, a telephone connected via a public system or a connected computer or network device and said prompt includes voice data providing an audio message wherein said network includes an Ethernet path having a collision domain with said network telephones connected thereto and further comprising another Ethernet path having a collision domain providing a connection between said network call processor and said line card, said another Ethernet path being connected to said Ethernet path.

16. A network telephone system according to claim 15, further comprising:
a line card connected to a public telephone line and connected to said network, said network processor sending packets to said telephone line card for initiating a call or connection based on said contact telephone data.

17. A network process, comprising:
providing a network system including a network processor, system data storage and devices connected to the network;

providing a plurality of network telephones, each network telephone being connected to said network and sending packets to and receiving packets from said network and converting said voice packets to analogue voice signals at said one or more of said network telephones for said call;

using said processor as a network call processor including monitoring a network telephone system, said network call processor sending packets to said network including address data for one or more of said network telephones;

providing a telephone line network interface connected to said network and providing a connection to a public switched telephone network;

monitoring at least the status of the network system with the network processor for alert data including one or more of status data, fault data and error data;

generating sets of administrator data packets and saving said sets of administrator data packets, said administrator data packets including contact telephone data for one or more network administrator and voice packets, said contact telephone data including data of a contact telephone with a corresponding address of one of said network telephones or an address of said telephone line network interface and a telephone number of a telephone connected to the public switched telephone network, said voice packets having different human speech message content for each of said sets of administrator data packets; and making a telephone call to the contact telephone including issuing an alert voice message upon said network processor receiving alert data and including selecting one of said sets of administrator data packets based on a predefined correlation of said sets of administrator data packets to said one or more of status data, fault data and error data and sending the selected packets in response to said alert data including sending said voice packets with voice data saved in system data storage based on said contact telephone data for one network administrator saved in the system data storage and receiving the voice packets at the contact telephone of the network administrator upon acceptance of the telephone call.

18. A network process according to claim 17, wherein said network call processor initiates a call based on said contact telephone data and converts said voice packets to analogue voice signals at said telephone line network interface for said call, said telephone line interface being connected to said network processor directly by an Ethernet path having the same collision domain as said network processor or via additional Ethernet paths having different collision domains from said network processor.

19. A network process according to claim 17, wherein at least one of said network telephones is connected to said network via an Internet gateway, said network telephone sending packets to and receiving packets from said network via said gateway, said network call processor sending packets to said network including address data, as said contact telephone data, for said network telephone connected to said network via the Internet gateway for initiating a call based on said address data and for converting said voice packets to analogue voice signals at said one or more of said network telephones for said call.

20. A network process according to claim 17, wherein said network includes a network device connected to said network, said network device sending packets to and receiving packets from said network, said network processor sending packets to said network device including address data, as said contact telephone data, for said network device for initiating a voice message based on said address data and for converting said voice packets to analogue voice signals at said network device.

21. A network process according to claim 17, wherein said network includes a network device connected to said network, said network device sending packets to and receiving packets from said network, said network device being operatively connected to a paging system, said network call processor sending packets to said network device including address data, as said contact telephone data, said network device providing a audio page.

22. A network process according to claim 17, further comprising the steps of:
providing a software interface at a network device;
providing a display of selected portions of data in said data storage, said data including settings data and preferences;
changing contact telephone data;
setting the correlation of said sets of administrator data packets to said one or more of status data, fault data and error data, with the software interface associating voice messages comprised of said voice data with potential status data, fault data or error data or types of status data, fault data or error data.

23. A network process according to claim 22, wherein said software interface includes a web browser and web pages accessible from said data storage based on an address associated with the network.

24. A network process according to claim 22, wherein said voice data includes a plurality of message prompts whereby said software interface allows selection of one or more of said prompts for inclusion in one or more of said sets of administrator data packets.

25. A network process according to claim 24, wherein at least some of said message prompts are prerecorded and precorrelated with defined criteria for sending administrator data packets.

26. A network process according to claim 17, further comprising:
providing a display of at least some data in said data storage at least on one of said network telephones.

* * * * *